M. A. WHITING.
MOTOR CONTROL.
APPLICATION FILED OCT. 19, 1911.
1,071,840. Patented Sept. 2, 1913.
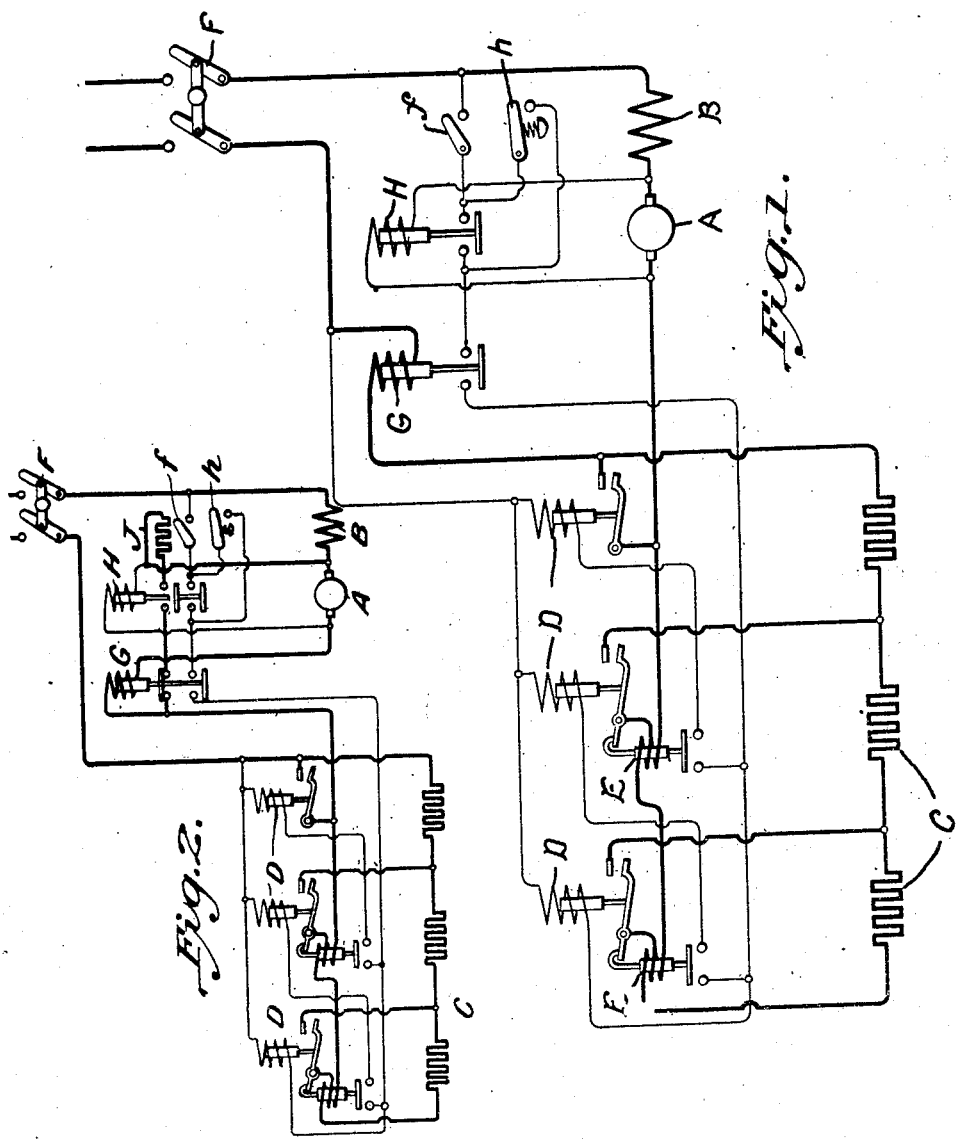
Witnesses:
Earl G. Klock
J. Ellis Glen
Inventor:
Max A. Whiting,
by
His Attorney.

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

MOTOR CONTROL.

1,071,840.   Specification of Letters Patent.   Patented Sept. 2, 1913.

Application filed October 19, 1911. Serial No. 655,459.

*To all whom it may concern:*

Be it known that I, MAX A. WHITING, a citizen of the United States, residing at Schenectady, county of Schenectady, State of New York, have invented certain new and useful Improvements in Motor Control, of which the following is a specification.

My invention relates to the control of electric motors for operating winches, capstans, hoisting drums, etc. where at starting there may be a certain amount of slack cable to be taken up before the load is thrown on to the motor; and the object of my invention is to provide controlling means suitable for motors driving loads of this character.

By my invention I so arrange the motor control that the motor is prevented from reaching a high speed while the slack cable is being taken up, and to this end I provide, in connection with the usual accelerating means or starting controller, means for rendering the controller inoperative to accelerate the motor until the load on the motor rises to a predetermined amount.

My invention will best be understood by reference to the accompanying drawings in which—

Figure 1 shows diagrammatically a motor control system arranged in accordance with my invention; and Fig. 2 shows a modification thereof.

In the particular embodiment of my invention shown in the drawing A represents the armature and B the field winding of an electric motor of the commutator type, such as a series wound direct current motor. The motor is shown provided with an automatic electrically operated step by step controller for gradually accelerating the motor. This controller which is of a type well known in the art comprises starting resistances C, magnetically actuated switches or contactors D for cutting out the resistances step by step, and current limiting devices E for preventing the resistance from being cut out too fast, or in other words, for insuring proper acceleration.

F represents the main switch for connecting the motor to the source of supply and *f* represents a switch in the control circuit, that is, in the circuit of the operating windings of the contactors D.

The arrangement thus far described is one which is well known in the art.

In order to prevent the electrically operated controller from cutting out the starting resistance and bringing the motor up to high speed while the slack cable is being taken up, I provide a pair of magnets G and H, the contacts of which are both included in the circuit of the operating windings of the starting controller, so that the starting controller is rendered inoperative until both windings close their contacts. The winding G is placed in series with the motor and therefore is energized with a current at all times proportional to the motor current, while the winding H is connected in shunt to the motor armature A and therefore is energized with a current which depends both on the motor current and on the motor speed.

The operation is as follows: With the motor at rest and switch *f* closed, the main switch F is closed to admit current to the motor. If the motor starts under light load as is the case if a slack cable is being taken up, the motor speed quickly rises to a value high enough to cut the motor current down to a small amount, so that, if the magnet G is energized sufficiently to close its contacts at the first instant when the switch F is closed, it soon opens its contacts as the motor speed rises. Magnet H is designed so that it does not close its contacts until after the motor armature A has reached a high enough speed to cause magnet G to drop its contacts. Thus during this first acceleration and operation under light load the starting controller remains inoperative. The magnet H retains its contacts closed with a comparatively small current in the winding, so that when the slack cable has been taken up and the load comes on to the motor, slowing the motor down sufficiently to draw enough current to energize winding G, winding H still holds its contacts closed so that the circuit for the starting controller windings is then completed. The left hand contactor D consequently closes, short-circuiting one section of the starting resistance C, and, after the motor current has fallen a sufficient amount to allow the contacts controlled by winding E to close, the second contactor D operates, and so on until all the starting resistance is cut out. Thus the starting controller is rendered operative only when both the motor current and the motor speed rise to predetermined amounts, but, when thus rendered operative, it acts precisely as the usual automatic controller operates when the motor circuit is first closed.

The operation above described is that which takes place under normal starting conditions. It may sometimes occur, however, that the motor may be required to start under load, that is, with no slack cable, in which case the motor speed and armature voltage might not rise sufficiently with all the starting resistance in circuit to cause relay H to close its contacts. To provide for the operation of the starting controller under such special conditions where relay H does not become energized, I propose to use a switch h in shunt to the contacts of relay H. This switch may be of the push button type, that is, a normally open switch which can be closed and kept closed only as long as the operator keeps his hand on it. For starting under load, the switch h is closed which closes the control circuit for the starting controller and enables it to cut out the resistance. As the motor speeds up, the armature voltage rises so that relay H closes its contacts and switch h may then be released.

Fig. 2 shows a modification which is identical with the arrangement shown in Fig. 1 with the addition of a circuit closed by relays G and H which acts further to limit the motor speed on light load. As has been explained, when the motor is running under light load relay G is deënergized and relay H energized. Under these conditions a shunt circuit, including a resistance J, is closed around the motor armature, and serves as a further limitation on the motor speed at light load. This arrangement may advantageously be employed where the amount of starting resistance C is not so great but that the motor could run up to speed under no load, with all the starting resistance in circuit, if the shunt circuit were not employed.

My invention is not limited to the particular form of starting controller shown in the drawings; furthermore, the means for rendering the controller inoperative until the proper time is capable of many different embodiments. Consequently, I do not desire to limit myself to the particular construction, connections and arrangement of parts shown and described, but aim in the appended claims to cover all modifications which are within the scope of my invention.

What I claim as new and desire to secure by Letters Patent of the United States, is,—

1. In combination with an electric motor, automatic accelerating means therefor, a magnet winding energized by a current proportional to the motor current, and means controlled by said magnet winding for rendering said accelerating means inoperative until the current in said magnet winding rises to a predetermined amount.

2. In combination with an electric motor of the commutator type, a controller for gradually accelerating said motor, a pair of magnets energized by currents proportional respectively to the motor current and to the motor armature voltage, and means for rendering said controller operative only when the currents in both magnet windings rise to predetermined amounts.

3. In combination with an electric motor of the commutator type, a starting resistance therefor, an electrically-operated controller for cutting out said resistance step-by-step, two sets of contacts coöperating to render said controller operative, and a pair of magnet windings energized by currents proportional respectively to the motor current and to the motor armature voltage and controlling said contacts to render the controller operative only when both currents rise to predetermined amounts.

4. In combination with an electric motor, an electromagnetic controller for gradually accelerating the motor, and means for energizing said controller only when both the motor current and motor speed rise to predetermined amounts.

5. In combination with an electric motor of the commutator type, a controller for gradually accelerating the motor, a pair of magnet windings energized by currents proportional respectively to the motor current and to the motor armature voltage, and means for limiting the motor speed to a comparatively low amount until the currents in both windings rise to predetermined amounts.

6. In combination with an electric motor, automatic accelerating means therefor, and means for rendering said accelerating means inoperative and closing a shunt circuit around the motor until the load on the motor rises to a predetermined amount.

7. In combination with an electric motor of the commutator type, a controller for gradually accelerating the motor, a pair of magnet windings energized by currents proportional respectively to the motor current and to the motor armature voltage, and means for closing a shunt circuit around the motor when the current in the first magnet is below, and the current in the other magnet above, predetermined amounts.

8. In combination with an electric motor of the commutator type, automatic accelerating means therefor, and means for rendering said accelerating means operative only when the motor current and the motor armature voltage both rise to predetermined amounts, and for closing a shunt circuit around the motor when the motor current is below, and the motor armature voltage above, predetermined amounts.

9. In combination with an electric motor, automatic accelerating means therefor, and means for rendering said accelerating means operative only when both the motor current and motor speed rise to predetermined amounts, and for closing a shunt circuit around the motor when the motor current is below and the motor speed above predetermined amounts.

In witness whereof, I have hereunto set my hand this 17th day of October, 1911.

MAX A. WHITING.

Witnesses:
BENJAMIN B. HULL,
HELEN ORFORD.

Copies of this patent may be obtained for five cents each, by addressing the "Commissioner of Patents, Washington, D. C."